United States Patent
Singh

(10) Patent No.: US 12,555,593 B2
(45) Date of Patent: Feb. 17, 2026

(54) WEB CONFERENCE AUDIO QUALITY VERIFICATION

(71) Applicant: CITRIX SYSTEMS, INC., Fort Lauderdale, FL (US)

(72) Inventor: Manbinder Pal Singh, Coral Springs, FL (US)

(*) Notice: Subject to any disclaimer, the term of this patent is extended or adjusted under 35 U.S.C. 154(b) by 790 days.

(21) Appl. No.: 17/726,339

(22) Filed: Apr. 21, 2022

(65) Prior Publication Data

US 2023/0343360 A1 Oct. 26, 2023

(51) Int. Cl.
*G10L 15/26* (2006.01)
*G06F 40/284* (2020.01)
*G10L 15/22* (2006.01)
*G10L 15/30* (2013.01)
*G10L 25/60* (2013.01)
*H04L 65/403* (2022.01)

(52) U.S. Cl.
CPC .......... *G10L 25/60* (2013.01); *G06F 40/284* (2020.01); *G10L 15/22* (2013.01); *G10L 15/26* (2013.01); *G10L 15/30* (2013.01); *H04L 65/403* (2013.01)

(58) Field of Classification Search
CPC ......... G10L 15/26; G10L 15/22; G10L 15/32; G10L 15/28; G10L 15/30; G10L 17/00; G10L 25/69; G10L 15/02; G10L 2015/088; G10L 21/0364; G10L 25/51; G10L 25/60; G10L 25/78; G10L 13/033; G10L 15/18; G10L 15/1815; G06F 40/284; G06F 40/253; G06F 40/40; G06F 40/166

USPC .......................................................... 704/235
See application file for complete search history.

(56) References Cited

U.S. PATENT DOCUMENTS

| | | | |
|---|---|---|---|
| 10,192,554 B1* | 1/2019 | Boehme .................. | G10L 15/26 |
| 11,017,778 B1* | 5/2021 | Thomson .......... | H04M 3/42382 |
| 12,057,954 B2* | 8/2024 | Nagesh ............... | H04L 12/1822 |
| 2010/0305945 A1* | 12/2010 | Krishnaswamy ....... | G10L 17/00 704/235 |
| 2019/0392837 A1* | 12/2019 | Jung ....................... | G10L 15/22 |
| 2020/0135204 A1* | 4/2020 | Robichaud ............. | G10L 25/78 |
| 2020/0243094 A1* | 7/2020 | Thomson ................ | G10L 15/28 |
| 2020/0349950 A1* | 11/2020 | Yoshioka ............... | G10L 15/08 |
| 2020/0411007 A1* | 12/2020 | Boehme ................. | G10L 15/32 |
| 2021/0104253 A1* | 4/2021 | Jolly ...................... | G10L 25/60 |
| 2021/0110812 A1* | 4/2021 | Naylor-Teece ........ | G10L 25/69 |
| 2021/0224319 A1* | 7/2021 | Ingel ..................... | G06F 16/686 |
| 2022/0028397 A1* | 1/2022 | Thomson ............... | G10L 15/26 |
| 2022/0188504 A1* | 6/2022 | Singh .................... | G06F 40/186 |

(Continued)

*Primary Examiner* — Vijay B Chawan

(57) ABSTRACT

A method may for audio quality verification may include generating a first transcript of a first audio data captured at a first client device engaged in a web conference session with a second client device. A second transcript of a second audio data received and/or output at the second client device may be generated and analyzed relative to the first transcript. In the event an above-threshold difference is detected between the first transcript and the second transcript, a notification may be generated for display at the first client device. The notification may indicate that the audio quality at the second client device fails to satisfy a quality threshold. Moreover, in some cases, the notification may identify portions of the first audio data that was not output at the second client device with sufficient audio quality, thereby enabling a repeat of those portions of the first audio data.

20 Claims, 7 Drawing Sheets

(56) References Cited

U.S. PATENT DOCUMENTS

| | | | |
|---|---|---|---|
| 2022/0417050 A1* | 12/2022 | Nagesh | G10L 15/26 |
| 2023/0129467 A1* | 4/2023 | Singh | G10L 15/1822 704/246 |
| 2023/0343330 A1* | 10/2023 | Machanavajhala | G10L 15/26 |
| 2023/0343360 A1* | 10/2023 | Singh | G10L 25/69 |

\* cited by examiner

WEB CONFERENCE AUDIO QUALITY VERIFICATION

TECHNICAL FIELD

The subject matter described herein relates generally to web conferencing and more specifically to the verification of audio quality during a web conference session.

BACKGROUND

A web conferencing application may provide access to a virtual meeting room in which multiple users in different locations may engage in real time audio data and/or video communication. The web conferencing application may support a variety of online communication sessions between two or more web-connected devices including, for example, meetings, training events, lectures, presentations, and/or the like. In some cases, the web conferencing application may also provide various collaborative features such as real time content sharing and editing.

SUMMARY

Methods, systems, and articles of manufacture, including computer program products, are provided for verifying audio quality during a web conference session. In one aspect, there is provided a system including at least one data processor and at least one memory. The at least one memory may store instructions, which when executed by the at least one data processor, cause the at least one data processor to at least: generate a first transcript of a first audio data captured at a first client device engaged in a web conference session with a second client device; generate a second transcript of a second audio data received and/or output at the second client device, the second audio data corresponding to the first audio data captured at the first client device; determine, based at least on an analysis of the first transcript and the second transcript, an audio quality at the second client device; and generate, for display at the first client device, a notification indicating the audio quality at the second client device.

In some variations, one or more of the features disclosed herein including the following features can optionally be included in any feasible combination. The at least one data processor may be further caused to at least: detect an above-threshold difference between the first transcript and the second transcript; and in response to detecting the above-threshold difference between the first transcript and the second transcript, generate the notification to include an indication that the audio quality at the second client device fails to satisfy a quality threshold.

In some variations, the at least one data processor may be further caused to at least: identify one or more portions of the second transcript exhibiting the above-threshold difference relative to the first transcript; map the one or more portions of the second transcript to one or more corresponding portions of the first audio data; and generate the notification to include an identification of the one or more corresponding portions of the first audio data.

In some variations, the notification may include an identification of a second user of the second device.

In some variations, the notification may include a quantity of client devices at which the audio quality fails to satisfy a quality threshold.

In some variations, the first transcript may be generated by applying a speech recognition algorithm to convert the first audio data into a first sequence of text tokens. The second transcript may be generated by applying the speech recognition algorithm to convert the second audio data into a second sequence of text tokens.

In some variations, the speech recognition algorithm may include a speech-to-text algorithm.

In some variations, the analysis of the first transcript and the second transcript may include detecting one or more mismatched text tokens and missing text tokens in the second transcript.

In some variations, the at least one data processor may be further caused to at least: align, based at least on a first timestamp associated with each text token in the first sequence of text tokens and a second timestamp associated with each text token in the second sequence of text tokens, the first transcript and the second transcript such that the analysis of the first transcript and the second transcript includes comparing a first text token from the first transcript that occur at a same time as a second text token from the second transcript.

In some variations, the at least one data processor may be further caused to at least: determine, based at least on a network bandwidth and/or an available computational resources, to generate the first transcript at the first client device and/or a web conference server associated with the web conference session.

In some variations, the at least one data processor may be further caused to at least: determine, based at least on a network bandwidth and/or an available computational resources, to generate the second transcript at the second client device and/or a web conference server associated with the web conference session.

In some variations, the at least one data processor may be further caused to at least: determine, based at least on a network bandwidth and/or an available computational resources, to perform the analysis of the first transcript and the second transcript at the first client device, the second client device, and/or a web conference server associated with the web conference session.

In some variations, the generating of the first transcript, the generating of the second transcript, and/or the analysis of the first transcript and the second transcript may be performed at least partially at a virtual desktop backend of a virtual desktop application deployed at the first client device and/or the second client device.

In another aspect, there is provided a method for verifying audio quality during a web conference session. The method may include: generating a first transcript of a first audio data captured at a first client device engaged in a web conference session with a second client device; generating a second transcript of a second audio data received and/or output at the second client device, the second audio data corresponding to the first audio data captured at the first client device; determining, based at least on an analysis of the first transcript and the second transcript, an audio quality at the second client device; and generating, for display at the first client device, a notification indicating the audio quality at the second client device.

In some variations, one or more of the features disclosed herein including the following features can optionally be included in any feasible combination. The method may further include: detecting an above-threshold difference between the first transcript and the second transcript; and in response to detecting the above-threshold difference between the first transcript and the second transcript, generating the notification to include an indication that the audio quality at the second client device fails to satisfy a quality threshold.

In some variations, the method may further include: identifying one or more portions of the second transcript exhibiting the above-threshold difference relative to the first transcript; mapping the one or more portions of the second transcript to one or more corresponding portions of the first audio data; and generating the notification to include an identification of the one or more corresponding portions of the first audio data.

In some variations, the notification may further include an identification of a second user of the second device.

In some variations, the notification may include a quantity of client devices at which the audio quality fails to satisfy a quality threshold.

In some variations, the method may further include: determining, based at least on a network bandwidth and/or an available computational resources, to generate the first transcript at the first client device and/or a web conference server associated with the web conference session; determining, based at least on the network bandwidth and/or the available computational resources, to generate the second transcript at the second client device and/or a web conference server associated with the web conference session; and determining, based at least on the network bandwidth and/or the available computational resources, to perform the analysis of the first transcript and the second transcript at the first client device, the second client device, and/or a web conference server associated with the web conference session.

In another aspect, there is provided a non-transitory computer readable medium storing instructions that cause operations when executed by at least one data processor. The operations may include: generating a first transcript of a first audio data captured at a first client device engaged in a web conference session with a second client device; generating a second transcript of a second audio data received and/or output at the second client device, the second audio data corresponding to the first audio data captured at the first client device; determining, based at least on an analysis of the first transcript and the second transcript, an audio quality at the second client device; and generating, for display at the first client device, a notification indicating the audio quality at the second client device.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to verifying audio quality during a web conferencing session, it should be readily understood that such features are not intended to be limiting. The claims that follow this disclosure are intended to define the scope of the protected subject matter.

DESCRIPTION OF DRAWINGS

When practical, like reference symbols in the various drawings indicate like elements.

DETAILED DESCRIPTION

Figure 1:
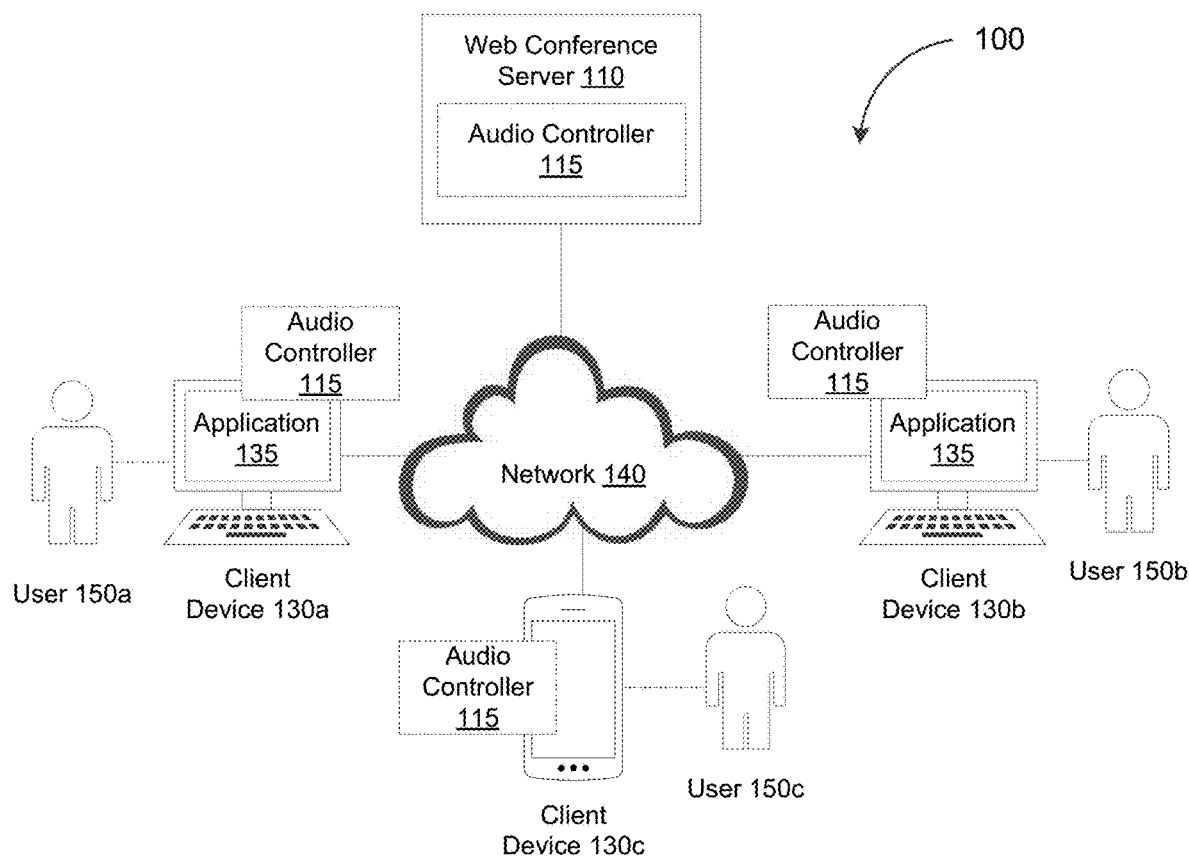
FIG. 1 depicts a system diagram illustrating an example of a web conferencing system, in accordance with some example embodiments.

A web conferencing application, which provides access to a virtual meeting room, may allow multiple users in different geographical locations to engage in a web conference session during which each user may contribute, in real time, a variety of content including, for example, text messages, audio data, video data, and/or the like. For example, a web conference session may include multiple attendees including a host who is responsible for scheduling the web conference session. Content captured at the client device of one attendee, for example, by a keyboard, a mouse, a microphone, and/or a camera associated with that client device, may be shared with and output at the client devices of the other attendees. In some cases, content available at the client device of one attendee may be shared when that attendee acts as a presenter and activates a screen sharing functionality. Doing so may allow the presenter to share at least a portion of the content displayed at the client device of the presenter and have that content be displayed at the client devices of the other attendees. Moreover, the web conferencing application may also support a variety of collaborative features such as real time editing of the shared content.

Content shared during a web conference session may include audio content contributed by the various attendees participating in the web conference session. For example, a microphone at a first client device engaged in a web conference session may capture audio data, such as speech data from a first user at the first client device, that is sent to a second client device engaged in the web conference session for output by one or more speakers at the second client device. The quality of the audio data received and output at the second client device may deteriorate due to a variety of reasons including, for example, a degradation of the network connection between the first client device and the second client device, a delay in audio processing at the first client device and/or the second client device, and/or the like. However, without making active checks with a second user at the second client device, the first user at the first client device is generally oblivious to the quality of the audio data received at the second client device. In extreme cases, the first user at the first client device may continue to speak even though the audio data that is received at the second client device is indecipherable to the second user at the second client device. As such, deterioration in audio quality, especially when they evade detection, may give rise to undesirable disruptions during a web conference session.

In some example embodiments, an audio controller may be configured to verify the quality of audio data exchanged during a web conference session. For example, the audio controller may generate a first transcript of a first audio data captured at a first client device engaged in a web conference session. Furthermore, the audio controller may generate a second transcript of a second audio data received and/or output received at a second client device engaged in the web conference session. The audio controller may verify an audio quality at the second client device based at least on an analysis of the first transcript and the second transcript. For instance, the audio controller may determine that the audio quality at the second client device fails to satisfy a quality threshold if the audio controller determines that the second transcript exhibits an above-threshold difference relative to the first transcript. Moreover, upon detecting the above-threshold difference between the first transcript and the second transcript, the audio controller may generate, for display at the first client device, a notification that includes an indication that the audio quality at the second client device fails to satisfy a quality threshold.

In some example embodiments, upon detecting the above-threshold difference between the first transcript and the second transcript, the audio controller may also identify one or more portions of the second transcript that exhibit the above-threshold difference relative to the corresponding portions of the first transcript. These portions of the second transcript may be mapped to the corresponding portions of the first audio data, which are received and/or output at the second client device with below-threshold audio quality. Accordingly, the notification generated for display at the first client device may further include an identification of the portions of the first audio data that are received and/or output at the second client device with below-threshold audio quality. Doing so may enable the first user at the first client device to repeat the portions of the first audio data that are received and/or output at the second client device with below-threshold audio quality.

FIG. 1 depicts a system diagram illustrating an example of a web conferencing system 100, in accordance with some example embodiments. Referring to FIG. 1, the web conferencing system 100 may include a web conference server 110 that is communicatively coupled via a network 140 with one or more client devices 130 including, for example, a first client device 130a, a second client device 130b, a third client device 130c, and/or the like. The one or more client devices 130 may be processor-based devices including, for example, a smartphone, a personal computer, a tablet computer, a wearable apparatus, an Internet-of-Things (IoT) appliance, and/or the like. The network 140 may be a wired network and/or a wireless network including, for example, a local area network (LAN), a virtual local area network (VLAN), a wide area network (WAN), a public land mobile network (PLMN), the Internet, and/or the like.

A web conferencing application 135 associated with the web conference server 110 may be deployed at each of the one or more client devices 130. The web conferencing application 135 may be configured to provide access to a virtual meeting room in which multiple attendees, such as a first user 150a at the first client device 130a, a second user 150b at the second client device 130b, and a third user 150c at the third client device 130c may participate in a web conference session during which a variety of data (e.g., text messages, audio data, video data, and/or the like) are exchanged in real time. In some cases, the web conferencing application 135 may be a cloud-based software application that is hosted at a central server, such as the web conference server 110, on one or more virtual machines. Alternatively and/or additionally, the web conferencing application 135 may be provided as a part of a workspace in a virtual desktop application, such as a high definition virtual desktop, in which case the functionalities of the web conferencing application 135 may be accessible during a virtual desktop session.

Referring again to FIG. 1, content captured at the first client device 130a during a web conference session, for example, by a keyboard, a mouse, a microphone, and/or a camera associated with the first client device 130a, may be shared and output the second client device 130b and/or the third client device 130c. In some cases, content available at the first client device 130a may be shared when that the first user 150a acts as a presenter and activates a screen sharing functionality associated with the web conferencing application 135. By activating the screen sharing functionality, at least a portion of the content displayed at the first client device 130a may be shared and displayed at the second client device 130b and/or the third client device 130c. The web conferencing application 135 may also support a variety of collaborative features such as real time editing of the shared content.

Content shared during a web conference session between, for example, the first client device 130a, the second client device 130b, and the third client device 130c, may include audio content contributed by the various attendees participating in the web conference session such as the first user 150a at the first client device 130a, the second user 150b at the second client device 130b, and the third user 150c at the third client device 130c. For example, a microphone at the first client device 130a may capture audio data, such as speech data and/or voice data from the first user 150a at the first client device 130a, that is sent to the second client device 130b and/or the third client device 130c for output by one or more speakers at the second client device 130b and/or the third client device 130c.

The quality of the audio data received and/or output at the second client device 130b and the third client device 130c may deteriorate due to a variety of reasons including, for example, a degradation of the network connection with the first client device 130a, a delay in audio processing at the first client device 130a, the second client device 130b and/or the third client device 130c, and/or the like. However, without making active checks with the second user 150b at the second client device 130b or the third user 150c at the third client device 130c, the first user 150a at the first client device 130*a* is generally oblivious to the quality of the audio data received and/or output at the second client device 130*b* and the third client device 130*c*. In extreme cases, the first user 150*a* at the first client device 130*a* may continue to speak even though the audio data that is received and/or output at the second client device 130*b* and/or the third client device 130*c* is indecipherable.

As such, in some example embodiments, an audio controller 115 may be configured to verify the quality of audio data exchanged during a web conference session. For example, the audio controller 115 may generate a first transcript of a first audio data captured at the first client device 130*a* engaged in a web conference session. Furthermore, the audio controller 115 may generate a second transcript of a second audio data received and/or output at the second client device 130*b* engaged in the web conference session. The audio controller 115 may verify an audio quality at the second client device 130*b* based at least on an analysis of the first transcript and the second transcript. For instance, the audio controller 115 may determine that the audio quality at the second client device 130*b* fails to satisfy a quality threshold if the audio controller 115 determines that the second transcript exhibits an above-threshold difference relative to the first transcript. Moreover, upon detecting the above-threshold difference between the first transcript and the second transcript, the audio controller 115 may generate, for display at the first client device 130*a*, a notification that includes an indication that the audio quality at the second client device 130*b* fails to satisfy a quality threshold.

In some cases, the notification may provide additional information to the first user 150*a* at the first client device 130*a*. For example, the notification may include a summary of the quantity of client devices at which at least a portion of the first audio data captured at the first client device 130*a* is output with below-threshold audio quality. Accordingly, the first user 150*a* may determine, based at least on this information, whether to repeat the portion of the first audio data. For instance, the first user 150*a* may repeat the first audio data in the event an above threshold portion (e.g., greater than a threshold quantity or percentage) of client devices were unable to output the first audio data with an above-threshold quality. Alternatively and/or additionally, where the notification identifies specific client devices that failed to output the first audio data with an above-threshold audio quality, the first user 150*a* may determine to repeat the first audio data if those client devices are associated with certain users (e.g., the second user 150*b* to whom the first audio data is particularly relevant).

The audio controller 115 may generate the first transcript and the second transcript by applying one or more speech recognition algorithms. For example, the audio controller 115 may apply a speech-to-text algorithm in order to convert the audio data captured at the first client device 130*a* into a first sequence of text tokens forming the first transcript. Similarly, the audio controller 115 may apply the speech-to-text algorithm to convert the audio data received and/or output at the second client device 130*b* into a second sequence of text tokens forming the second transcript. In some cases, a single text token in an transcript may correspond to one or more words between pauses. Successive text tokens in an transcript may therefore correspond to successive sentences or successive paragraphs present in the corresponding speech. However, it should be appreciated that depending on the type of speech-to-text algorithm, a single text token may correspond to a word, a phrase, a sentence, or a paragraph.

In some example embodiments, the analysis of the first transcript and the second transcript may be performed based on the respective metadata associated with each transcript. For instance, the timestamps associated with the individual text tokens included in the first transcript and the timestamps associated with the individual text tokens included in the second transcript may enable the audio controller 115 to temporally align the first transcript and the second transcript for further analysis. That is, the audio controller 115 may compare a first text token from the first transcript that occurs at a same time as a second text token from the second transcript (including certain adjustments to account for possible network and processing delays) in order to detect discrepancies, such as missing text tokens and mismatched text tokens, that may be present between the first transcript and the second transcript.

Upon detecting the above-threshold difference between the first transcript and the second transcript, the audio controller 115 may also identify one or more portions of the second transcript that exhibit the above-threshold difference relative to the corresponding portions of the first transcript. These portions of the second transcript may be mapped to the corresponding portions of the first audio data, which are received and/or output at the second client device 130*b* with below-threshold audio quality. Accordingly, the notification generated for display at the first client device 130*a* may further include an identification of the portions of the first audio data that are received and/or output at the second client device 130*b* with below-threshold audio quality. Doing so may enable the first user 150*a* at the first client device 130*a* to repeat the portions of the first audio data that are received and/or output at the second client device 130*b* with below-threshold audio quality.

Figure 2:
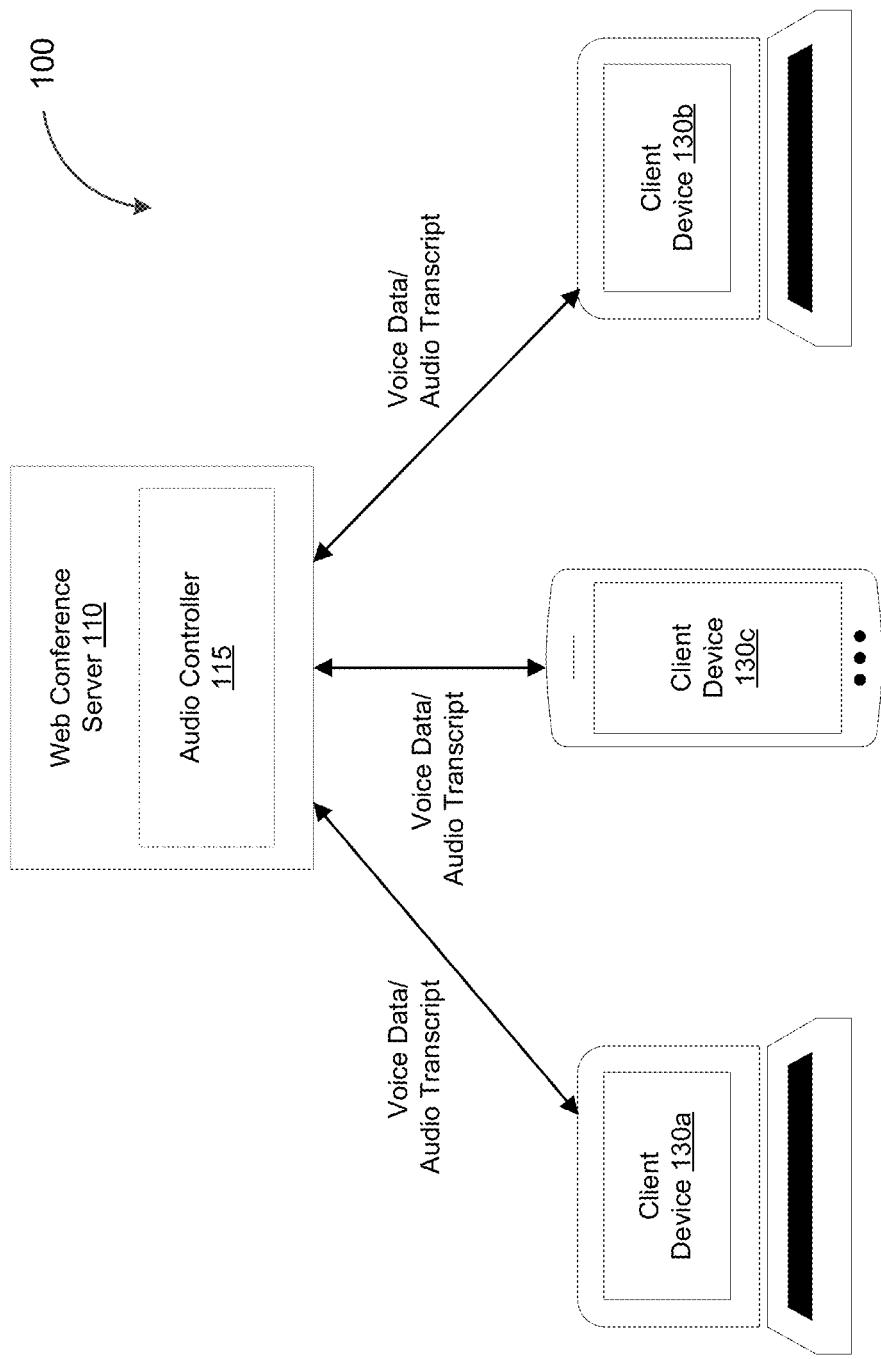
FIG. 2 depicts a schematic diagram illustrating an example of dataflow within a web conferencing system, in accordance with some example embodiments.
Figure 3:
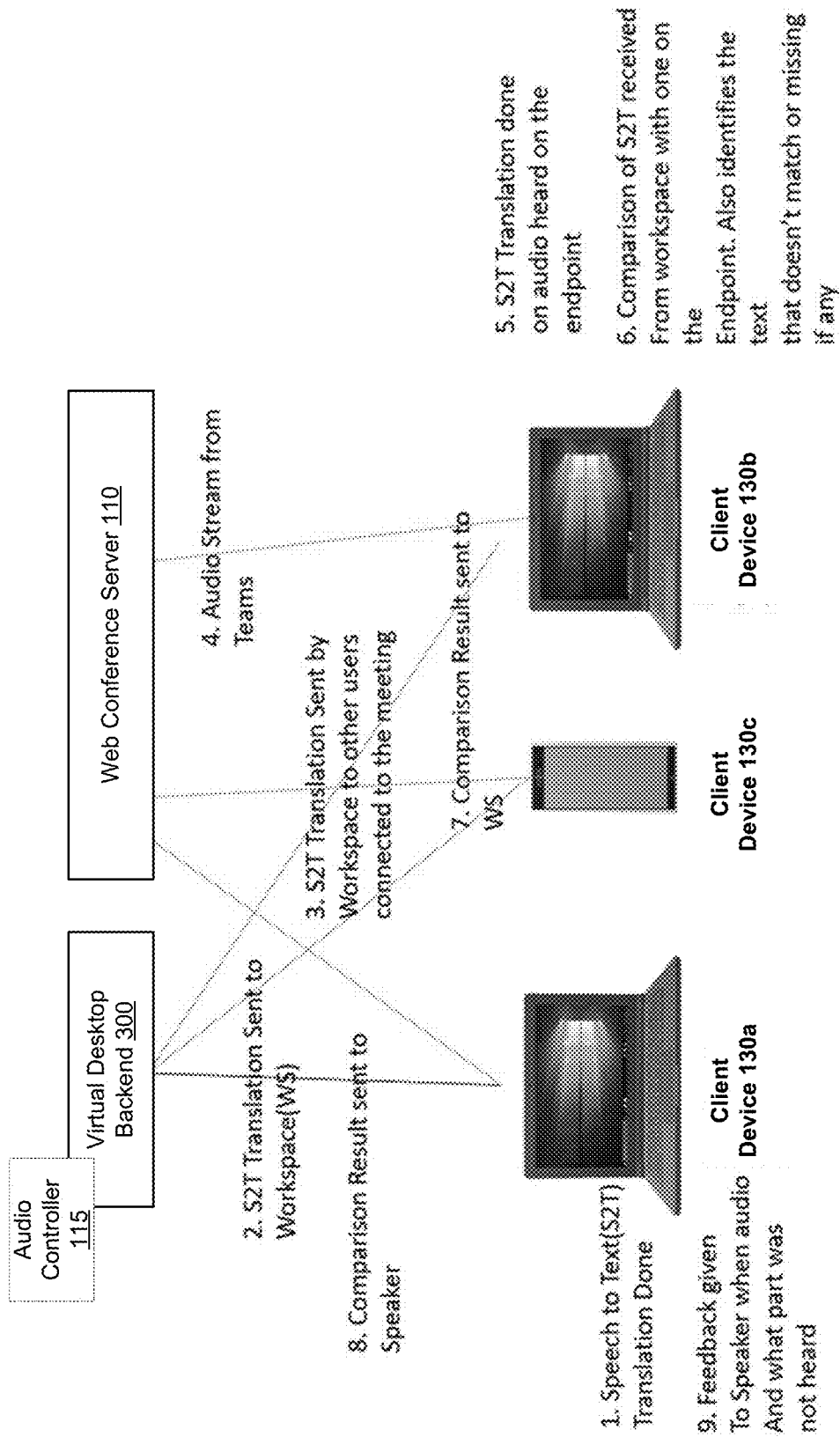
FIG. 3 depicts a schematic diagram illustrating another example of dataflow within a web conferencing system, in accordance with some example embodiments.

Referring now to FIGS. 1-3, the generation and the analysis of transcripts may be performed at a variety of different locations within the web conferencing system 100. For example, FIGS. 1 and 3 show that instances of the audio controller 115 may be deployed at the web conference server 110, the virtual desktop backend 300, and at each of the first client device 130*a*, the second client device 130*b*, and the third client device 130*c*. As such, the capture of audio datas, the generating of the corresponding transcripts, and the analysis of the transcripts may be performed locally at individual client devices. Alternatively and/or additionally, the generation and/or analysis of transcripts may be performed remotely, for example, at the web conference server 110 or a virtual desktop backend 300. For instance, the analysis of the first transcript associated with the first client device 130*a* and the second transcript associated with the second client device 130*b* may be performed at the first client device 130*a*, the second client device 130*b*, the web conference server 110, and/or the virtual desktop backend 300.

The one or more locations at which the generation and analysis of transcript are performed may be determined based on a variety of factors including, for example, network bandwidth, available computational resources, and/or the like. Accordingly, if, for example, the first client device 130*a* and the second client device 130*b* lack sufficient computational resources, the generation and/or analysis of the first transcript and the second transcript may be offloaded to the web conference server 110 and/or the virtual desktop backend 300. However, in some cases, the generation and analysis of transcripts may be kept local as much as possible if there is insufficient network bandwidth to support the exchange of audio datas and/or the corresponding transcripts.

To further illustrate, FIG. 2 depicts a schematic diagram illustrating one example data flow within the web conferencing system 100. As shown in FIG. 2, the web conference server 110 (e.g., the audio controller 115) may exchange audio data and transcripts with one or more of the first client device 130a, the second client device 130b, and the third client device 130c. When there is sufficient computational resources at the first client device 130a, for example, the first client device 130a may apply a speech recognition algorithm (e.g., a speech-to-text algorithm and/or the like) to the audio data captured at the first client device 130a to generate the first transcript before sending the first transcript to the web conference server 110.

In some cases, the web conference server 110, for example, the audio controller 115, may perform the analysis of the first transcript and the second transcript received from the second client device 130b. Alternatively, the web conference server 110 may send, to the second client device 130b, the first transcript such that the second client device 130b may perform the analysis of the first transcript and the second transcript. As yet another alternative, the web conference server 110 may send, to the first client device 130a, the second transcript associated with the second client device 130b such that the analysis of the first transcript and the second transcript is performed at the first client device 130a.

FIG. 3 depicts a schematic diagram illustrating another example data flow within the web conferencing system 100. In the example shown in FIG. 3, the web conferencing system 100 may include the virtual desktop backend 300 configured to generate and/or analyze the transcripts associated with one or more of the first client device 130a, the second client device 130b, and the third client device 130c. The virtual desktop backend 300 may be associated with a virtual desktop application deployed at one or more of the first client device 130a, the second client device 130b, and the third client device 130c. Moreover, the web conferencing application 135 may be provided as a part of a workspace in the virtual desktop application (e.g., a high definition virtual desktop and/or the like). Accordingly, in some cases, at least a portion of the tasks associated with the generation and/or analysis of transcripts may be performed at the virtual desktop backend 300 instead of or in addition to the web conference server 110. For example, in cases where the first client device 130a and the second client device 130b lack sufficient computational resources, the generation and/or analysis of the first transcript and the second transcript may be offloaded to the virtual desktop backend 300.

Figure 4:
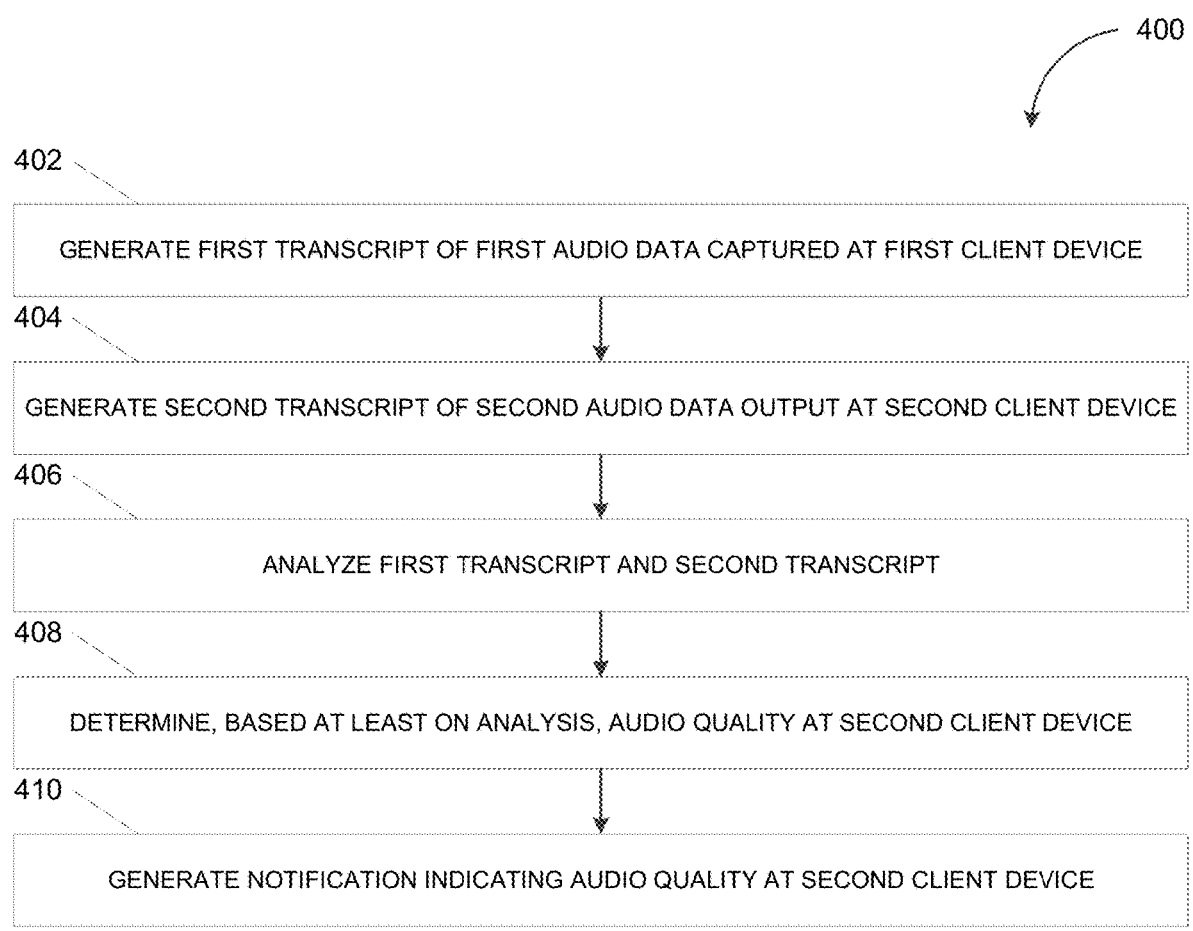
FIG. 4 depicts a flowchart illustrating an example of audio quality verification during a web conference session, in accordance with some example embodiments.

FIG. 4 depicts a flowchart illustrating an example of process 400 for audio quality verification during a web conference session, in accordance with some example embodiments. Referring to FIG. 4, the process 400 may be performed by the audio controller 115 which, as shown in FIGS. 1 and 3, may be deployed at the web conference server 110, the virtual desktop backend 300, and at individual client devices such as the first client device 130a, the second client device 130b, and the third client device 130c. In some example embodiments, the audio controller 115 may perform the process 400 in order to verify the audio quality of a web conference session between, for example, the first client device 130a and the second client device 130b.

At 402, the audio controller 115 may generate a first transcript of a first audio data captured at a first client device. For example, the audio controller 115 may generate a first transcript of a first audio data captured at the first client device 130a (e.g., by a microphone at the first client device 130a). The audio controller 115 may generate the first transcript by applying a speech recognition algorithm such as, for example, a speech-to-text algorithm and/or the like. For instance, the audio controller 115 may apply the speech recognition algorithm to convert the first audio data captured at the first client device 130a into a sequence of text tokens, each of which corresponding to one or more words, phrases, sentences, and/or paragraphs present in the first audio data. As shown in FIGS. 2 and 3, depending on factors such as network bandwidth and available computational resources, the generation of the first transcript may be performed by the audio controller 115 deployed at the first client device 130a, the second client device 130b, the web conference server 110, and/or the virtual desktop backend 300.

At 404, the audio controller 115 may generate a second transcript of a second audio data received and/or output at a second client device. In some example embodiments, the audio controller 115 may generate a second transcript of a second audio data received and/or output at the second client device 130b. For example, the audio controller 115 may generate the second transcript by applying a speech recognition algorithm such as, for example, a speech-to-text algorithm and/or the like, to convert the second audio data received and/or output at the second client device 130b into a sequence of text tokens, with each text token corresponding to one or more words, phrases, sentences, and/or paragraphs present in the second audio data. As shown in FIGS. 2 and 3, depending on factors such as network bandwidth and available computational resources, the generation of the second transcript may be performed by the audio controller 115 deployed at the first client device 130a, the second client device 130b, the web conference server 110, and/or the virtual desktop backend 300.

At 406, the audio controller 115 may analyze the first transcript and the second transcript. The second audio data received and/or output at the second client device 130b may correspond to the first audio data captured at the first client device 130a. That is, the first audio data captured at the first client device 130a may be sent to the second client device 130b (either directly or indirectly via the web conference server 110) and output as the second audio data. Nevertheless, audio quality at the second client device 130b may be poor due to a variety of reasons including, for example, a degradation of the network connection between the first client device 130a and the second client device 130b, a delay in audio processing at the first client device 130a and/or the second client device 130b, and/or the like. The second audio data received and/or output at the second client device 130b may therefore deviate from the first audio data captured at the first client device 130a. In extreme cases, for example, the second audio data received and/or output at the second client device 130b may be indecipherable to the second user 150b at the second client device 130b.

As such, in some example embodiments, the audio controller 115 may analyze the first transcript of the first audio data captured at the first client device 130a and the second transcript of the second audio data received and/or output at the second client device 130b. The analysis of the first transcript and the second transcript may be performed based on the respective metadata associated with each transcript. For example, the timestamps associated with the individual text tokens included in the first transcript and the timestamps associated with the individual text tokens included in the second transcript may enable the audio controller 115 to temporally align the first transcript and the second transcript. Accordingly, the audio controller 115 may compare text tokens that occur at a same time (including certain adjustments to account for possible network and processing delays) to detect discrepancies, such as missing tokens and mismatched tokens, that may be present in the second transcript. As shown in FIGS. 2 and 3, the analysis of the first transcript and the second transcript may be performed by the audio controller 115 deployed at the first client device 130a, the second client device 130b, the web conference server 110, and/or the virtual desktop backend 300.

At 408, the audio controller 115 may determine, based at least on the analysis, an audio quality at the second client device. In some example embodiments, audio quality at the second client device 130b may correspond to a magnitude of difference between the first transcript of the first audio data captured at the first client device 130a and the second transcript of the second audio data received and/or output at the second client device 130b.

At 410, the audio controller 110 may generate a notification indicating the audio quality at the second client device. For example, where the audio controller 115 determines that the second transcript exhibits an above-threshold deviation relative to the first transcript, the audio controller 115 may determine that the audio quality at the second client device 130b fails to satisfy a quality threshold. Accordingly, the audio controller 115 may generate, for example, for display at the first client device 130a, a notification that includes an indication that the audio quality at the second client device 130b fails to satisfy a quality threshold. In some cases, upon detecting the above-threshold difference between the first transcript and the second transcript, the audio controller 115 may also identify one or more portions of the second transcript that exhibit the above-threshold difference relative to the corresponding portions of the first transcript. The audio controller 115 may map these portions of the second transcript to one or more corresponding portions of the first audio data, which are output at the second client device 130b with below-threshold audio quality. As such, in some example embodiments, the notification generated for display at the first client device 130a may further include an identification of the portions of the first audio data that are output at the second client device 130b (e.g., as the second audio data) with below-threshold audio quality.

In some cases, the notification may also provide additional information to the first user 150a at the first client device 130a such as a summary of the quantity of client devices at which at least a portion of the first audio data captured at the first client device 130a is output with below-threshold audio quality. Accordingly, the first user 150a may determine, based at least on this information, whether to repeat the portion of the first audio data. For example, the first user 150a may determine to repeat the first audio data in the event an above threshold portion (e.g., greater than a threshold quantity or percentage) of client devices were unable to output the first audio data with an above-threshold quality. Alternatively and/or additionally, where the notification identifies specific client devices that failed to output the first audio data with an above-threshold audio quality, the first user 150a may determine to repeat the first audio data if those client devices are associated with certain users. Doing so may enable the first user 150a at the first client device 130a to repeat the portions of the first audio data that are received and/or output at the second client device 130b if, for example, the first audio data is particularly relevant to the second user 150b at the second client device 130b.

Figure 5A:
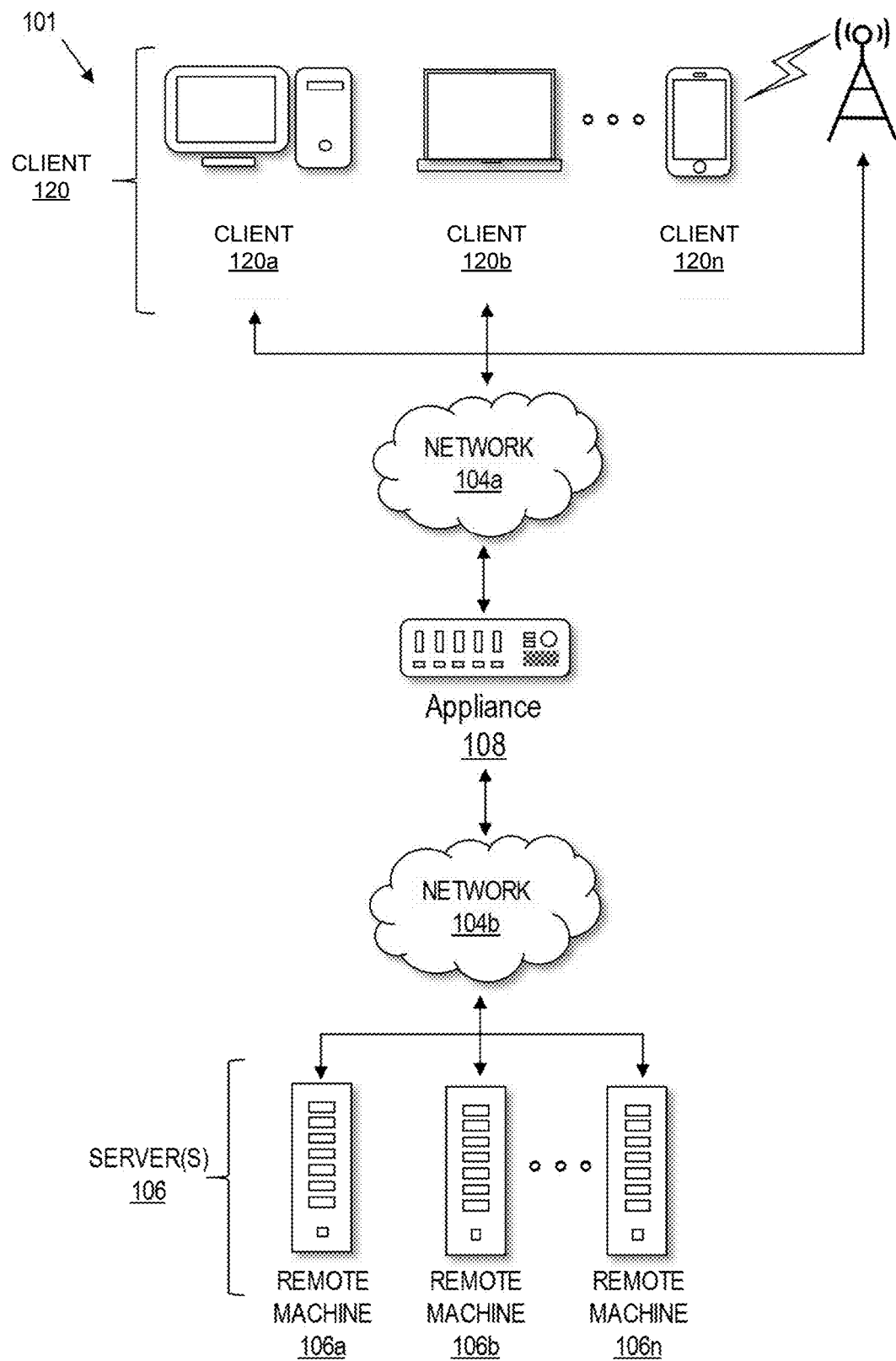
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1-4 and 5A, the network environment 101 in which various aspects of the disclosure may be implemented may include one or more clients 120a-120n, one or more remote machines 106a-106n, one or more networks 104a and 104b, and one or more appliances 108 installed within the network environment 101. The clients 120a-120n communicate with the remote machines 106a-106n via the networks 104a and 104b.

In some example embodiments, the clients 120a-120n may communicate with the remote machines 106a-106n via an appliance 108. The illustrated appliance 108 is positioned between the networks 104a and 104b, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104a and/or 104b.

The clients 120a-120n may be generally referred to as client machines, local machines, clients, client nodes, client computers, client devices, computing devices, endpoints, or endpoint nodes. One or more of the clients 120a-120n may implement, for example, the first client device 130a, the second client device 130b, the third client device 130c, and/or the like. The remote machines 106a-106n may be generally referred to as servers or a server farm. In some example embodiments, a client 120 may have the capacity to function as both a client node seeking access to resources provided by a server 106 and as a server 106 providing access to hosted resources for other clients 120a-120n. The networks 104a and 104b may be generally referred to as a network 104. The network 104 including the networks 104a and 104b may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the resource controller 115 and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 120.

In yet other example embodiments, a server 106 may execute a virtual machine, such as the first virtual machine 125*a* and/or the second virtual machine 125*b,* to provide, for example, to the user 150 at the client device 130, access to a computing environment such as the application 135. The virtual machine may be managed by, for example, a hypervisor (e.g., the first hypervisor 165*a,* the second hypervisor 165*b,* and/or the like), a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
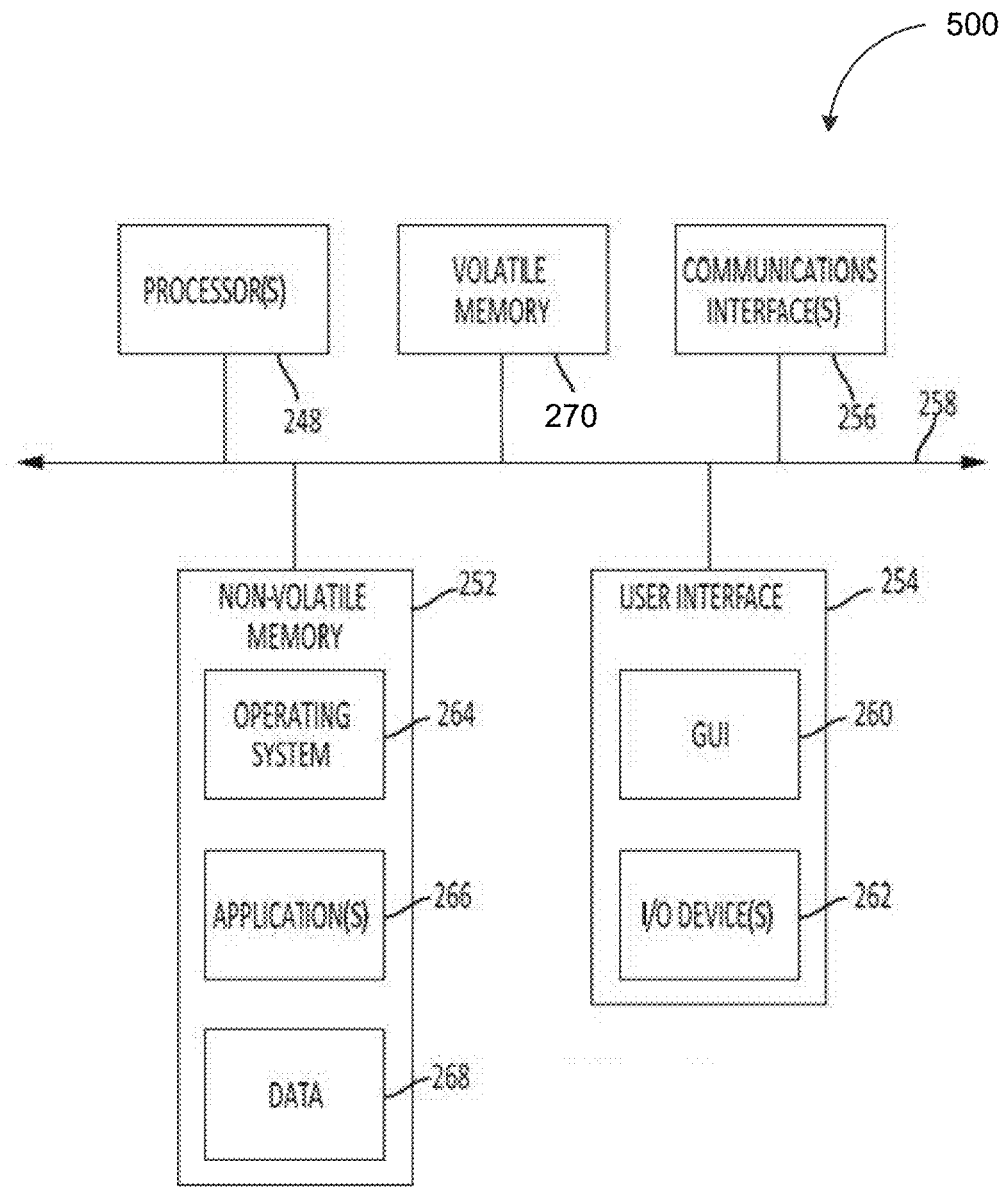
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1-4 and 5A-B, the computing device 500 may be useful for practicing an embodiment of the migration controller 110 and the client device 130.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the migration controller 110 and the client device 130 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 120), may execute a virtual machine, which provides an execution session within which applications execute on behalf of a user or a client computing device (e.g., the clients 120), such as a hosted desktop session (e.g., associated with the application 135), may execute a terminal services session to provide a hosted desktop environment, or may provide access to a computing environment including one or more of: one or more applications, one or more desktop applications, and one or more desktop sessions in which one or more applications may execute.

Figure 5C:
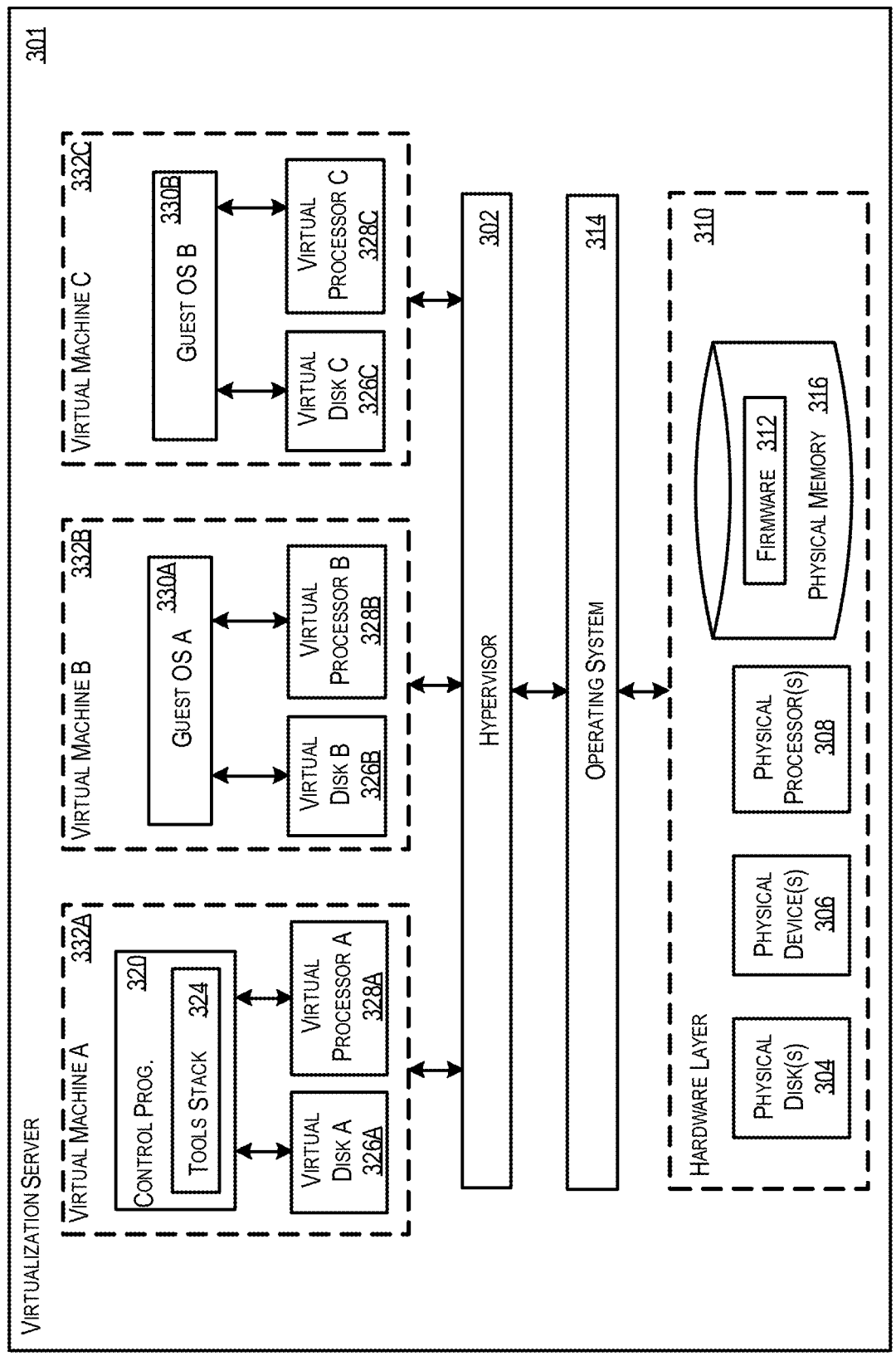
FIG. 5C depicts a high-level architecture of an example of a virtualization system for implementing a computing system, in accordance with some example embodiments.

FIG. 5C depicts a high-level architecture of an example of a virtualization system for implementing the computing system 110, in accordance with some example embodiments. As shown in FIG. 5C, the virtualization system may be a single-server or multi-server system, or a cloud system, including at least one virtualization server 301 configured to provide virtual desktops and/or virtual applications to one or more client access devices 120*a-c.* A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 5C may be deployed as and/or implemented by one or more embodiments of server 106 illustrated in FIG. 5A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 5C illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Washington; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Florida.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 5C, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 5C illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, cause the system to:
   determine at least one network factor associated with a web conference session between a first client device and a second client device;
   generate a first transcript of a first audio data captured at the first client device;
   send, based on the at least one network factor, instructions that cause the second client device to generate a second transcript of a second audio data, output at the second client device, the second audio data corresponding to the first audio data captured at the first client device;
   determine, based at least on an analysis of the first transcript and the second transcript, an audio quality at the second client device;
   determine, based on the audio quality at the second client device, a portion of the second audio, output at the second client device, fails to satisfy a quality threshold; and
   generate, for display at the first client device, a notification indicating the audio quality at the second client device, wherein the notification identifies the portion of the second audio, output at the second client device, that fails to satisfy the quality threshold.

2. The system of claim 1, wherein the instructions, when executed by the at least one data processor, further causes the system to:
   detect an above-threshold difference between the first transcript and the second transcript; and
   in response to detecting the above-threshold difference between the first transcript and the second transcript, generate the notification to include an indication that the audio quality at the second client device fails to satisfy the quality threshold.

3. The system of claim 2, wherein the instructions, when executed by the at least one data processor, further causes the system to:
identify one or more portions of the second transcript exhibiting the above-threshold difference relative to the first transcript;
map the one or more portions of the second transcript to one or more corresponding portions of the first audio data; and
generate the notification to include an identification of the one or more corresponding portions of the first audio data.

4. The system of claim 2, wherein the notification includes an identification of a second user of the second client device.

5. The system of claim 2, wherein the notification includes a quantity of client devices at which the audio quality fails to satisfy the quality threshold.

6. The system of claim 1, wherein the first transcript is generated by applying a speech recognition algorithm to convert the first audio data into a first sequence of text tokens, and wherein the second transcript is generated by applying the speech recognition algorithm to convert the second audio data into a second sequence of text tokens.

7. The system of claim 6, wherein the speech recognition algorithm comprises a speech-to-text algorithm.

8. The system of claim 6, wherein the analysis of the first transcript and the second transcript includes detecting one or more mismatched text tokens and missing text tokens in the second transcript.

9. The system of claim 6, wherein the instructions, when executed by the at least one data processor, further cause the system to:
align, based at least on a first timestamp associated with each text token in the first sequence of text tokens and a second timestamp associated with each text token in the second sequence of text tokens, the first transcript and the second transcript such that the analysis of the first transcript and the second transcript includes comparing a first text token from the first transcript that occur at a same time as a second text token from the second transcript.

10. The system of claim 1, wherein the instructions, when executed by the at least one data processor, further causes the system to:
send, based on the at least one network factor, instructions that cause a web conference server associated with the web conference session to generate the first transcript.

11. The system of claim 1, wherein causing the second client device to generate the second transcript is further based on available computational resources.

12. The system of claim 1, wherein the instructions, when executed by the at least one data processor, further cause the system to:
send, based on the at least one network factor and based on an available computation resources, instructions that cause a web conference server associated with the web conference session to perform the analysis of the first transcript and the second transcript.

13. The system of claim 1, wherein the generating of the first transcript, the generating of the second transcript, and/or the analysis of the first transcript and the second transcript are performed at least partially at a virtual desktop backend of a virtual desktop application deployed at the first client device and/or the second client device.

14. A computer-implemented method, comprising:
determining at least one network factor associated with a web conference session between a first client device and a second client device;
generating a first transcript of a first audio data captured at the first client device;
sending, based on the at least one network factor, instructions that cause the second client device to generate a second transcript of a second audio data, output at the second client device, the second audio data corresponding to the first audio data captured at the first client device;
determining, based at least on an analysis of the first transcript and the second transcript, an audio quality at the second client device;
determining, based on the audio quality at the second client device, a portion of the second audio, output at the second client device, fails to satisfy a quality threshold; and
generating, for display at the first client device, a notification indicating the audio quality at the second client device, wherein the notification identifies the portion of the second audio, output at the second client device, that fails to satisfy the quality threshold.

15. The method of claim 14, further comprising:
detecting an above-threshold difference between the first transcript and the second transcript; and
in response to detecting the above-threshold difference between the first transcript and the second transcript, generating the notification to include an indication that the audio quality at the second client device fails to satisfy the quality threshold.

16. The method of claim 15, further comprising:
identifying one or more portions of the second transcript exhibiting the above-threshold difference relative to the first transcript;
mapping the one or more portions of the second transcript to one or more corresponding portions of the first audio data; and
generating the notification to include an identification of the one or more corresponding portions of the first audio data.

17. The method of claim 15, wherein the notification further includes an identification of a second user of the second client device.

18. The method of claim 15, wherein the notification includes a quantity of client devices at which the audio quality fails to satisfy the quality threshold.

19. The method of claim 15, wherein sending instructions that cause the second client device to generate the second transcript is further based on available computational resources, the method further comprising:
sending, based on the at least one network factor and based on an available computational resources, instructions that cause a web conference server associated with the web conference session to generate the first transcript; and
sending, based on the at least one network factor and the available computational resources, instructions that cause the web conference server to perform the analysis of the first transcript and the second transcript.

20. One or more non-transitory computer readable medium storing instructions, which when executed by at least one data processor, cause:
determining at least one network factor associated with a web conference session between a first client device and a second client device;

generating a first transcript of a first audio data captured at the first client device;

sending, based on the at least one network factor, instructions that cause the second client device to generate a second transcript of a second audio data, output at the second client device, the second audio data corresponding to the first audio data captured at the first client device;

determining, based at least on an analysis of the first transcript and the second transcript, an audio quality at the second client device;

determining, based on the audio quality at the second client device, a portion of the second audio, output at the second client device, fails to satisfy a quality threshold; and generating, for display at the first client device, a notification indicating the audio quality at the second client device, wherein the notification identifies the portion of the second audio, output at the second client device, that fails to satisfy the quality threshold.

* * * * *